United States Patent
Aastuen et al.

(10) Patent No.: US 8,757,858 B2
(45) Date of Patent: Jun. 24, 2014

(54) HOLLOW BACKLIGHT WITH TILTED LIGHT SOURCE

(75) Inventors: David J. W. Aastuen, Shoreview, MN (US); Kenneth A. Epstein, St. Paul, MN (US); Byung-Soo Ko, Kyeonggi-do (KR); John A. Wheatley, Lake Elmo, MN (US)

(73) Assignee: 3M Innovative Properties Company, St. Paul, MN (US)

(*) Notice: Subject to any disclaimer, the term of this patent is extended or adjusted under 35 U.S.C. 154(b) by 233 days.

(21) Appl. No.: 12/995,368

(22) PCT Filed: Jun. 1, 2009

(86) PCT No.: PCT/US2009/045832
§ 371 (c)(1),
(2), (4) Date: Feb. 22, 2011

(87) PCT Pub. No.: WO2009/149010
PCT Pub. Date: Dec. 10, 2009

(65) Prior Publication Data
US 2011/0134659 A1    Jun. 9, 2011

Related U.S. Application Data

(60) Provisional application No. 61/058,780, filed on Jun. 4, 2008.

(51) Int. Cl.
*F21V 7/04* (2006.01)
*G02B 6/00* (2006.01)
*F21V 8/00* (2006.01)

(52) U.S. Cl.
CPC .................... *G02B 6/0096* (2013.01)
USPC ............................. 362/609; 362/623; 362/628

(58) Field of Classification Search
CPC .................................................. G02B 6/0096
USPC .................................................. 362/609, 623
See application file for complete search history.

(56) References Cited

U.S. PATENT DOCUMENTS

| | | | |
|---|---|---|---|
| 3,610,729 A | 10/1971 | Rogers | |
| 3,711,176 A | 1/1973 | Alfrey, Jr. | |

(Continued)

FOREIGN PATENT DOCUMENTS

| | | |
|---|---|---|
| DE | 199 61 491 | 12/2000 |
| EP | 0 426 397 | 5/1991 |

(Continued)

OTHER PUBLICATIONS

3M Diffusing Film Alternative (DFA), Maximum uniformity and efficiency in flat panel displays, Brochure, 2 pages, 1996.

(Continued)

*Primary Examiner* — David J Makiya
(74) *Attorney, Agent, or Firm* — Jay R. Pralle; Lisa P. Fulton

(57) ABSTRACT

In one embodiment, the invention provides backlight comprising a front reflector (102) and a back reflector (104) disposed to form a hollow light cavity (106) with a first light source (108) proximate one end of the front reflector (102) and having a tilt angle (110) of from 5° to 90°, and a first asymmetric light collimator (116) extending between at least the first light source (108) and the back reflector (104) for directing light from the first light source (108) into the hollow light cavity (106).

24 Claims, 6 Drawing Sheets

(56) References Cited

U.S. PATENT DOCUMENTS

| | | | |
|---|---|---|---|
| 3,773,882 | A | 11/1973 | Schrenk |
| 3,884,606 | A | 5/1975 | Schrenk |
| 4,040,727 | A | 8/1977 | Ketchpel |
| 4,446,305 | A | 5/1984 | Rogers |
| 4,456,336 | A | 6/1984 | Chung |
| 4,540,623 | A | 9/1985 | Im |
| 4,791,540 | A | 12/1988 | Dreyer |
| 5,103,337 | A | 4/1992 | Schrenk |
| 5,126,880 | A | 6/1992 | Wheatley |
| 5,136,479 | A | 8/1992 | Ruffner |
| 5,337,068 | A | 8/1994 | Stewart |
| 5,360,659 | A | 11/1994 | Arends |
| 5,381,309 | A | 1/1995 | Borchardt |
| 5,440,197 | A | 8/1995 | Gleckman |
| 5,448,404 | A | 9/1995 | Schrenk |
| 5,453,855 | A | 9/1995 | Nakamura |
| 5,568,316 | A | 10/1996 | Schrenk |
| 5,594,830 | A | 1/1997 | Winston |
| 5,751,388 | A | 5/1998 | Larson |
| 5,771,328 | A | 6/1998 | Wortman |
| 5,793,456 | A | 8/1998 | Broer |
| 5,816,677 | A | 10/1998 | Kurematsu |
| 5,825,543 | A | 10/1998 | Ouderkirk |
| 5,828,488 | A | 10/1998 | Ouderkirk |
| 5,845,038 | A | 12/1998 | Lundin |
| 5,867,316 | A | 2/1999 | Carlson |
| 5,882,774 | A | 3/1999 | Jonza |
| 5,965,247 | A | 10/1999 | Jonza |
| 5,971,551 | A | 10/1999 | Winston |
| 5,976,686 | A | 11/1999 | Kaytor |
| 6,019,485 | A | 2/2000 | Winston |
| 6,036,328 | A | 3/2000 | Ohtsuki |
| 6,080,467 | A | 6/2000 | Weber |
| 6,122,103 | A | 9/2000 | Perkins |
| 6,157,486 | A | 12/2000 | Benson, Jr. |
| 6,157,490 | A | 12/2000 | Wheatley |
| 6,210,785 | B1 | 4/2001 | Weber |
| 6,262,842 | B1 | 7/2001 | Ouderkirk |
| 6,267,492 | B1 | 7/2001 | Reid |
| 6,276,803 | B1 | 8/2001 | Aoyama |
| 6,280,063 | B1 | 8/2001 | Fong et al. |
| 6,282,821 | B1 | 9/2001 | Freier |
| 6,354,709 | B1 | 3/2002 | Campbell |
| 6,367,941 | B2 | 4/2002 | Lea |
| 6,368,699 | B1 | 4/2002 | Gilbert |
| 6,454,452 | B1 | 9/2002 | Sasagawa |
| 6,531,230 | B1 | 3/2003 | Weber |
| 6,566,689 | B2 | 5/2003 | Hoelen |
| 6,600,175 | B1 | 7/2003 | Baretz et al. |
| 6,636,283 | B2 | 10/2003 | Sasagawa |
| 6,663,262 | B2 | 12/2003 | Boyd et al. |
| 6,673,425 | B1 | 1/2004 | Hebrink |
| 6,738,349 | B1 | 5/2004 | Cen |
| 6,762,743 | B2 | 7/2004 | Yoshihara |
| 6,783,349 | B2 | 8/2004 | Neavin |
| 6,788,358 | B1 | 9/2004 | Kim |
| 6,809,892 | B2 | 10/2004 | Toyooka |
| 6,814,456 | B1 | 11/2004 | Huang |
| 6,846,089 | B2 | 1/2005 | Stevenson |
| 6,893,135 | B2 | 5/2005 | Wright |
| 6,895,164 | B2 | 5/2005 | Saccomanno |
| 6,905,212 | B2 | 6/2005 | Pate |
| 6,905,220 | B2 | 6/2005 | Wortman |
| 6,917,399 | B2 | 7/2005 | Pokorny |
| 6,937,303 | B2 | 8/2005 | Jang |
| 6,974,229 | B2 | 12/2005 | West |
| 6,975,455 | B1 | 12/2005 | Kotchick |
| 7,009,343 | B2 | 3/2006 | Lim |
| 7,052,168 | B2 | 5/2006 | Epstein |
| 7,072,096 | B2 | 7/2006 | Holman |
| 7,164,836 | B2 | 1/2007 | Wright |
| 7,178,965 | B2 | 2/2007 | Parker |
| 7,220,026 | B2 | 5/2007 | Ko |
| 7,220,036 | B2 | 5/2007 | Yi |
| 7,223,005 | B2 | 5/2007 | Lamb |
| 7,229,198 | B2 | 6/2007 | Sakai |
| 7,277,609 | B2 | 10/2007 | Cassarly |
| 7,285,802 | B2 | 10/2007 | Ouderkirk |
| 7,296,916 | B2 | 11/2007 | Ouderkirk |
| 7,317,182 | B2 | 1/2008 | Schultz |
| 7,320,538 | B2 | 1/2008 | Ko |
| 7,329,982 | B2 | 2/2008 | Conner |
| 7,350,951 | B2 * | 4/2008 | Sakai et al. .................. 362/555 |
| 7,364,342 | B2 | 4/2008 | Parker et al. |
| 7,416,309 | B2 | 8/2008 | Ko |
| 7,436,469 | B2 | 10/2008 | Gehlsen |
| 7,436,996 | B2 | 10/2008 | Ben-Chorin |
| 7,446,827 | B2 | 11/2008 | Ko |
| 7,473,019 | B2 * | 1/2009 | Laski ............................ 362/612 |
| 7,481,563 | B2 | 1/2009 | David |
| 7,513,634 | B2 | 4/2009 | Chen |
| 7,525,126 | B2 | 4/2009 | Leatherdale |
| 7,530,712 | B2 * | 5/2009 | Lin et al. ....................... 362/247 |
| 7,600,908 | B2 * | 10/2009 | Chang et al. .................. 362/623 |
| 7,604,381 | B2 | 10/2009 | Hebrink et al. |
| 7,607,814 | B2 | 10/2009 | Destain |
| 7,660,509 | B2 | 2/2010 | Bryan |
| 7,695,180 | B2 | 4/2010 | Schardt |
| 7,740,387 | B2 | 6/2010 | Schultz |
| 7,773,834 | B2 | 8/2010 | Ouderkirk |
| 8,382,324 | B2 * | 2/2013 | Kang et al. ............... 362/249.02 |
| 8,556,442 | B2 * | 10/2013 | Jang et al. .................... 362/97.1 |
| 8,616,754 | B2 * | 12/2013 | Ko et al. ....................... 362/623 |
| 2001/0030857 | A1 | 10/2001 | Futhey et al. |
| 2002/0060907 | A1 | 5/2002 | Saccomanno |
| 2002/0070914 | A1 | 6/2002 | Bruning et al. |
| 2002/0141194 | A1 | 10/2002 | Wortman |
| 2002/0159019 | A1 | 10/2002 | Pokorny |
| 2002/0175632 | A1 | 11/2002 | Takeguchi |
| 2003/0043567 | A1 | 3/2003 | Hoelen |
| 2003/0086680 | A1 | 5/2003 | Saccomanno |
| 2003/0202363 | A1 | 10/2003 | Adachi |
| 2004/0012943 | A1 * | 1/2004 | Toyooka ......................... 362/31 |
| 2004/0061814 | A1 | 4/2004 | Kim |
| 2004/0066651 | A1 | 4/2004 | Harumoto |
| 2004/0119908 | A1 | 6/2004 | Sakai |
| 2004/0196667 | A1 | 10/2004 | Lea |
| 2004/0219338 | A1 | 11/2004 | Hebrink |
| 2005/0007756 | A1 | 1/2005 | Yu |
| 2005/0007758 | A1 | 1/2005 | Lee |
| 2005/0063195 | A1 | 3/2005 | Kawakami |
| 2005/0073825 | A1 | 4/2005 | Kuo |
| 2005/0135115 | A1 | 6/2005 | Lamb |
| 2005/0135117 | A1 | 6/2005 | Lamb |
| 2005/0200295 | A1 | 9/2005 | Lim |
| 2005/0243576 | A1 | 11/2005 | Park |
| 2005/0265029 | A1 | 12/2005 | Epstein et al. |
| 2005/0265042 | A1 | 12/2005 | Kim |
| 2005/0265046 | A1 | 12/2005 | Liu |
| 2005/0280756 | A1 | 12/2005 | Kim |
| 2005/0285133 | A1 | 12/2005 | Hung |
| 2005/0286264 | A1 | 12/2005 | Kim |
| 2006/0002141 | A1 | 1/2006 | Ouderkirk |
| 2006/0005620 | A1 | 1/2006 | Koike |
| 2006/0028817 | A1 | 2/2006 | Parker |
| 2006/0082700 | A1 | 4/2006 | Gehlsen |
| 2006/0103777 | A1 | 5/2006 | Ko |
| 2006/0124918 | A1 | 6/2006 | Miller |
| 2006/0131601 | A1 | 6/2006 | Ouderkirk |
| 2006/0146562 | A1 | 7/2006 | Ko |
| 2006/0146566 | A1 | 7/2006 | Ko |
| 2006/0152943 | A1 | 7/2006 | Ko |
| 2006/0187650 | A1 | 8/2006 | Epstein |
| 2006/0193577 | A1 | 8/2006 | Ouderkirk |
| 2006/0210726 | A1 | 9/2006 | Jones |
| 2006/0220040 | A1 | 10/2006 | Suzuki |
| 2006/0221610 | A1 | 10/2006 | Chew |
| 2006/0250707 | A1 | 11/2006 | Whitney |
| 2006/0257678 | A1 | 11/2006 | Benson |
| 2006/0262564 | A1 | 11/2006 | Baba |
| 2006/0268554 | A1 | 11/2006 | Whitehead |
| 2006/0284569 | A1 | 12/2006 | Wey |
| 2006/0290842 | A1 | 12/2006 | Epstein |
| 2006/0290844 | A1 | 12/2006 | Epstein |

(56) References Cited

U.S. PATENT DOCUMENTS

| | | | |
|---|---|---|---|
| 2007/0008722 A1 | 1/2007 | Fujino | |
| 2007/0024994 A1 | 2/2007 | Whitney | |
| 2007/0047228 A1 | 3/2007 | Thompson | |
| 2007/0047254 A1 | 3/2007 | Schardt | |
| 2007/0047262 A1 | 3/2007 | Schardt | |
| 2007/0081330 A1 | 4/2007 | Lee | |
| 2007/0091641 A1 | 4/2007 | Lin | |
| 2007/0092728 A1 | 4/2007 | Ouderkirk | |
| 2007/0147037 A1 | 6/2007 | Wang | |
| 2007/0153162 A1 | 7/2007 | Wright | |
| 2007/0153384 A1 | 7/2007 | Ouderkirk | |
| 2007/0153548 A1 | 7/2007 | Hamada | |
| 2007/0171676 A1 | 7/2007 | Chang | |
| 2007/0189032 A1 | 8/2007 | Chang | |
| 2007/0223245 A1 | 9/2007 | Lee | |
| 2007/0257266 A1 | 11/2007 | Leatherdale | |
| 2007/0257270 A1 | 11/2007 | Lu | |
| 2007/0258241 A1 | 11/2007 | Leatherdale | |
| 2007/0258246 A1 | 11/2007 | Leatherdale | |
| 2008/0002256 A1 | 1/2008 | Sasagawa | |
| 2008/0025045 A1 | 1/2008 | Mii | |
| 2008/0049419 A1 | 2/2008 | Ma | |
| 2008/0057277 A1 | 3/2008 | Bluem | |
| 2009/0122575 A1* | 5/2009 | Omura et al. | 362/608 |
| 2010/0156953 A1 | 6/2010 | Nevitt | |
| 2010/0165001 A1 | 7/2010 | Savvateev | |
| 2010/0165621 A1 | 7/2010 | Hoffend | |
| 2010/0165660 A1 | 7/2010 | Weber | |
| 2010/0238686 A1* | 9/2010 | Weber et al. | 362/609 |
| 2010/0315832 A1 | 12/2010 | Pijlman et al. | |
| 2011/0043719 A1* | 2/2011 | Thunhorst et al. | 349/58 |
| 2011/0051047 A1* | 3/2011 | O'Neill et al. | 349/67 |
| 2011/0075398 A1 | 3/2011 | Wheatley | |
| 2011/0096529 A1 | 4/2011 | Wheatley | |
| 2011/0199352 A1* | 8/2011 | Wheatley et al. | 345/207 |

FOREIGN PATENT DOCUMENTS

| | | |
|---|---|---|
| EP | 0 650 010 | 4/1995 |
| EP | 1 070 913 | 1/2001 |
| EP | 1 333 705 | 8/2003 |
| EP | 1 376 708 | 1/2004 |
| EP | 1 640 756 | 3/2006 |
| EP | 1 837 701 | 9/2007 |
| EP | 1 942 302 | 9/2008 |
| JP | 09-005737 | 1/1997 |
| JP | 11-72625 | 3/1999 |
| JP | 2004-031180 | 1/2004 |
| JP | 2004-055430 | 2/2004 |
| JP | 2004-071576 | 3/2004 |
| JP | 2004-087973 | 3/2004 |
| JP | 2004-158336 | 6/2004 |
| JP | 2004-171947 | 6/2004 |
| JP | 2004-342429 | 12/2004 |
| JP | 2005-093147 | 4/2005 |
| JP | 2005-173546 | 6/2005 |
| JP | 2005-292546 | 10/2005 |
| JP | 2005-327682 | 11/2005 |
| JP | 2006-221922 | 8/2006 |
| JP | 2006-260924 | 9/2006 |
| JP | 2006-269364 | 10/2006 |
| JP | 2006-269365 | 10/2006 |
| JP | 2008-060061 | 3/2008 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01726 | 1/1997 |
| WO | WO 99/36248 | 7/1999 |
| WO | WO 99/36262 | 7/1999 |
| WO | WO 99/39224 | 8/1999 |
| WO | WO 00/43815 | 7/2000 |
| WO | WO 02/097324 | 12/2002 |
| WO | WO 2004/031818 | 4/2004 |
| WO | WO 2006/010249 | 2/2006 |
| WO | WO 2006/043344 | 4/2006 |
| WO | WO 2006/125174 | 11/2006 |
| WO | WO 2008/144636 | 11/2008 |
| WO | WO 2008/144644 | 11/2008 |
| WO | WO 2008/144650 | 11/2008 |
| WO | WO 2008/144656 | 11/2008 |
| WO | WO 2008/146229 | 12/2008 |
| WO | WO 2008/147753 | 12/2008 |
| WO | WO 2009/100307 | 8/2009 |
| WO | WO 2009/105450 | 8/2009 |

OTHER PUBLICATIONS

Cai et al., "Reflectors for Efficient and Uniform Distribution of Radiation for Lighting and Infrared Based on Non-Imaging Optics", SPIE, vol. 1528, pp. 118-128, 1991.

Collares-Pereire et al., "High Concentration Two-Stage Optics for Parabolic Trough Solar Collectors with Tubular Absorber and Large Rim Angle", Solar Energy, vol. 47, No. 6, pp. 457-466, 1991.

Baker et al., Daylighting in Architecture: A European Reference Book, pp. 4.3-4.5, 1993.

Blanco et al., "Asymmetric CPC Solar Collectors with Tubular Receiver: Geometric Characteristics and Optimal Configurations", Solar Energy, vol. 37, No. 1, pp. 49-54, 1986.

Denker et al., 45.1: Invited Paper: Advanced Polarizer Film for Improved Performance of Liquid Crystal Displays, 3 pages, SID 2006.

Freyssinier et al., "Evaluation of light emitting diodes for signage applications", Third International Conference of Solid State Lighting, Proceedings of SPIE, 5187, 309-317, 2004.

Hung et al., Novel Design for LED Lens and Backlight System, pp. 476-479, IDMC 2007 Taipei, Taiwan.

Kalantar and Okada, "RGB-LED Backlighting Monitor/TV for Reproduction of Images in Standard and Extended Color Spaces", FMC10-3, pp. 683-686, International Display Workshop, 2004.

Macleod, H.A., Thin-film optical filters, Second Edition, Title Page and Table of Contents, MacMillan Publishing Co., New York, 1986.

Stover, Carl PhD, Advanced Polarizer Film for Improved Performance of Liquid Crystal Displays, 10 pages, Presented at the Society for Information Displays International Conference, San Francisco, CA, Jun. 4-9, 2006.

TCO 05 (The Swedish Confederation of Professional Employees, version 2.0, Sep. 21, 2005, p.9.

Thelan, Design of Optical Interference Coatings, McGraw Hill, Inc. Title Page, Table of Contents, and Preface, 5 pages, 1989.

Tripanagnostopoulos, Y. and Souliotis, M., "Integrated collector storage solar systems with asymmetric CPC reflectors", Renewable Energy, vol. 29, pp. 223-248, www.sciencedirect.com, 2004.

Video Electronics Standards Association (VESA), Flat Panel Display Measurements Standard, v. 2.0, Jun. 1, 2001.

Weber et al. "Giant Birefringent Optics in Multilayer Polymer Mirrors", Science, vol. 287, Mar. 2000.

Winston et al., *Nonimaging Optics*, Title Page & Table of Contents, Elsevier Academic Press, Amsterdam, 2005.

Vikuiti ™ Display Enhancement Brochure, Vikuiti ™ Brightness Enhancement Film (BEF) II, 2 pages, Copyright © 3M IPC, 2002.

Vikuiti ™ Display Enhancement Brochure, Vikuiti ™ Brightness Enhancement Film-Diffuse 400 (DBEF-D400), 2 pages, Copyright ©, 2004.

Vikuiti ™ Display Enhancement Brochure, Vikuiti ™ Dual Brightness Enhancement Film-Diffuse 550 (DBEF-D550), 2 pages, © 3M 2004.

U.S. Appl. No. 61/030,767, entitled "Backlights Having Selected Output Light Flux Distributions and Display Systems Using Same", filed Feb. 22, 2008.

U.S. Appl. No. 61/026,876, entitled "Hollow Backlight with Structured Films", filed Feb. 7, 2008.

U.S. Appl. No. 60/939,085, entitled "Recycling Backlights with Semi-specular Components", filed May 20, 2007.

(56) References Cited

OTHER PUBLICATIONS

U.S. Appl. No. 60/939,084, entitled "Thin Hollow Backlights with Beneficial Design Characteristics", filed May 20, 2007.

U.S. Appl. No. 60/939,083, entitled "White Light Backlights and the Like with Efficient Utilization of Colored LED Sources", filed May 20 2007.

U.S. Appl. No. 60/939,082, entitled "Collimating Light Injectors for Edge-lit Backlights", filed May 20, 2007.

U.S. Appl. No. 60/744,112, entitled "Wide Angle Mirror System", filed Mar. 31, 2006.

U.S. Appl. No. 60/978,304, entitled "Light Emitting Diode with Bonded Semiconductor Wavelength Converter", filed Oct. 8, 2007.

U.S. Appl. No. 61/013,782 entitled "Optical Article", filed Dec. 14, 2007.

U.S. Appl. No. 60/939,079, entitled "Backlight and Display System Using Same", filed May 20, 2007.

Search Report for International Application No. PCT/US2009/045832, 4 pgs.

Written Opinion for International Application No. PCT/US2008/045832, 7 pgs.

* cited by examiner

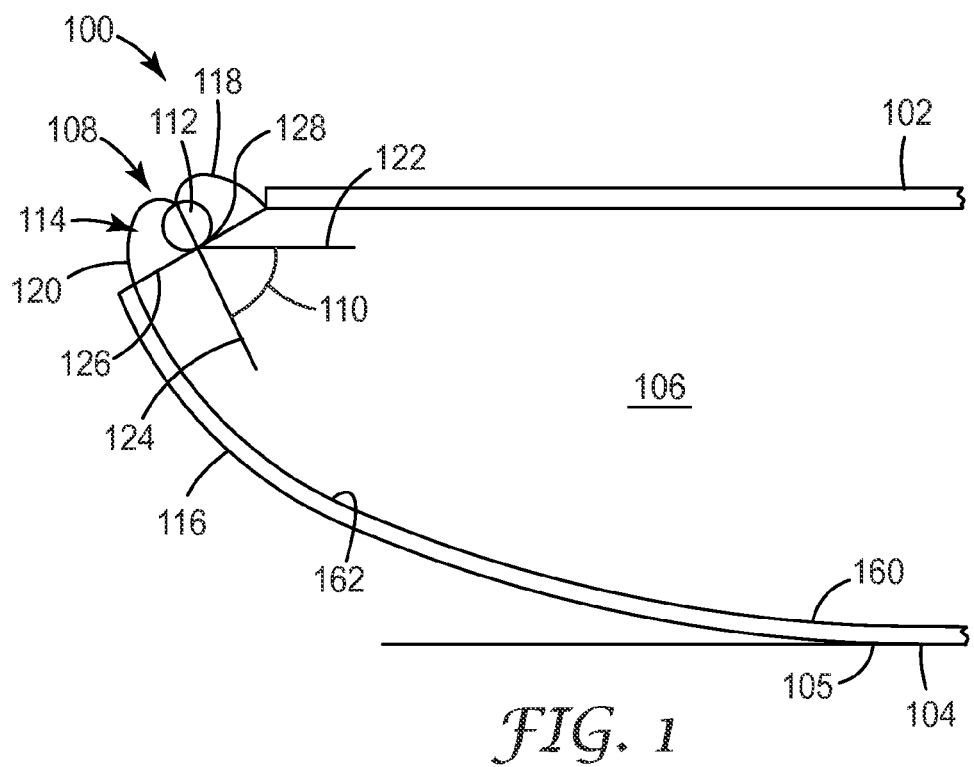
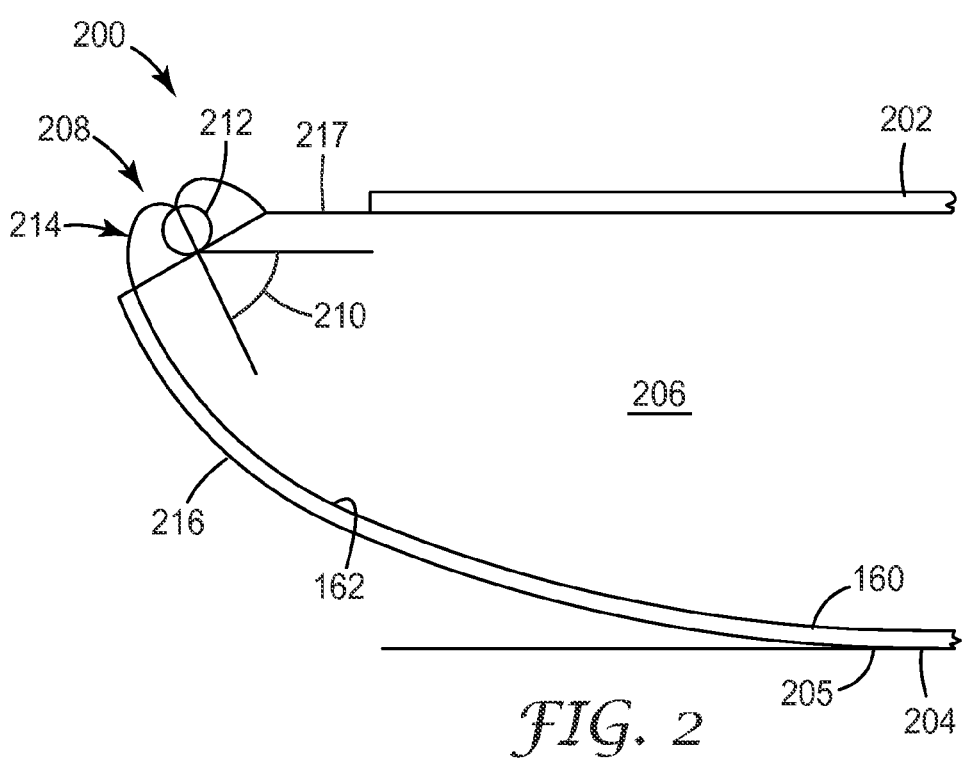

HOLLOW BACKLIGHT WITH TILTED LIGHT SOURCE

CROSS REFERENCE TO RELATED APPLICATIONS

This application is a national stage filing under 35 U.S.C. 371 of PCT/US2009/045832, filed on Jun. 1, 2009, which claims priority to U.S. Provisional Application No. 61/058,780, filed on Jun. 4, 2008, the disclosure of which is incorporated by reference in its/their entirety herein.

BACKGROUND

The present disclosure is related to extended area light sources suitable for illuminating a display or graphic, commonly referred to as backlights.

Backlights are used to illuminate displays such as LCD computer monitors, cellphone displays, personal digital assistants, and other hand-held devices. In an effort to reduce weight, hollow backlights have been developed. Some hollow backlights have utilized symmetric concentrators or light injectors, including symmetric parabolic concentrators, in combination with a light source to direct light into the hollow light cavity. However, such light injectors increase the total size of the display because of the volume of the symmetric light injector. The increase in the display size is due to an increased bezel width required to accommodate the size of the symmetric light injector.

FIG. 8 illustrates a prior art backlight 800 utilizing a symmetric light injector. The backlight 800 has a front reflector 802, back reflector 804, and side reflector 806 that defines the light cavity 808. Between the light source 810 and the light cavity 808, a compound parabolic concentrator 812 directs light from the light source into the light cavity. The bezel width is identified as "W".

SUMMARY

In one embodiment, the invention provides backlight comprising a front reflector and a back reflector disposed to form a hollow light cavity with a first light source proximate one end of the front reflector and having a tilt angle of from 5° to 90°, and a first asymmetric light collimator extending between at least the first light source and the back reflector for directing light from the first light source into the hollow light cavity.

In another embodiment, the invention provides the backlight above further comprising a second light source proximate another end of the front reflector and having a tilt angle of from 5° to 90°, and a second asymmetric light collimator extending between the second light source and the back reflector for directing light from the second light source into the hollow light cavity.

In other embodiments, the asymmetric light collimator is curved; the asymmetric collimator is parabolic; there may be more than one asymmetric collimator disposed between a light source and the front and back reflectors; and the light source comprises a CCFL lamp or an LED die.

BRIEF DESCRIPTION OF THE DRAWINGS

FIG. 1 is a schematic cross-sectional view of one embodiment of a backlight;

FIG. 2 is a schematic cross-sectional view of one embodiment of a backlight;

DETAILED DESCRIPTION

Figure 3:
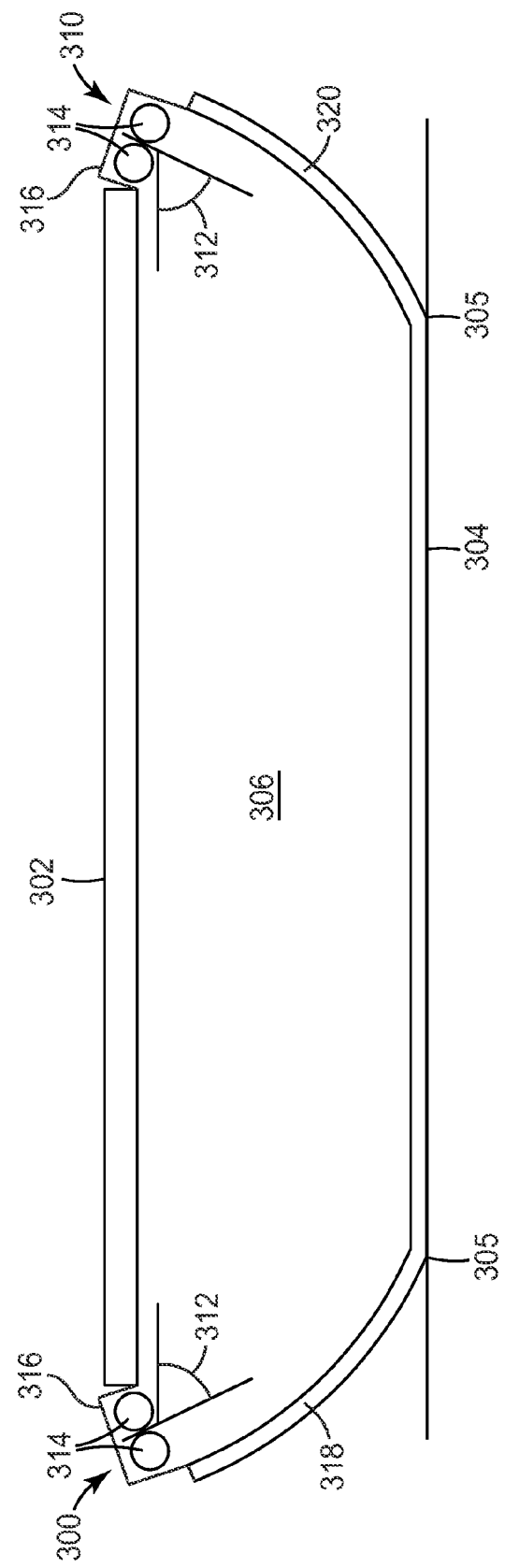
FIG. 3 is a schematic cross-sectional view of one embodiment of a backlight.

Among other advantages, the backlights of the invention are lighter in weight than backlights containing solid lightguides and provide a way to decrease the bezel width of hollow edge-lit backlight systems while providing brightness and spatial uniformity that is adequate for the intended application. The backlights of the invention have utility for both fluorescent tube and LED light sources. Such backlights have utility for use in LCDs, sign boxes, and luminaires.

One embodiment of a backlight of the invention is shown in FIG. 1. Backlight 100 comprises a front reflector 102 and a back reflector 104 which are disposed in a manner to form a hollow light cavity 106. In this embodiment, the front reflector 102 is planar. In other embodiments, the front reflector may be curved or have curvature. Light source 108 is proximate the front reflector 102 and its position relative to the tangent of the front reflector 102 is defined by a tilt angle 110. Tilt angle 110 is defined by the intersection 128 of i) a line 122 that is parallel with a tangent to the plane of the front reflector; and ii) a line 124 that is normal to and bisects the aperture plane 126 of the light source.

The tilt angle may generally range from 5° to 90° and may be any number or range between 5° and 90°. In other embodiments, the tilt angle can be 15°, 30°, 45°, 60°, or 90° or any number or range in between 15° and 90°.

Light source 108 comprises a light element 112, a light element reflector 114, and an asymmetric light collimator 116 for directing light into the hollow light cavity. "Asymmetric" with respect to collimators means that each collimator with respect to a light source is shaped differently, for example, in having different lengths (including zero length), different shapes, or both. A first light collimator 116 extends between the light source 108 and the back reflector 104 and into the light cavity. In this embodiment, the second light collimator has no length between the light source 108 and front reflector 102. In this embodiment, light collimator 116 and back reflector 104 are unitary. In other embodiments, the light collimator and back reflector, or portions thereof, can be separate components or can be made of different materials.

The boundary between the light collimator 116 and back reflector is where the tangent to the light collimator is horizontal 105.

As shown in FIG. 1, light collimator 116 is curved or has curvature. It is desirable that light that strikes the front reflector 102 has a relatively large incidence angle. Thus, the light rays are desirably provided from the light source at a relatively small angle from tangent line 122. However, some of the light may be delivered at a relatively large angle from tangent line 122. In this case, the curved light collimator reflects such light so that such light strikes the front reflector 122 at a relatively large incidence angle. In other embodiments, the curvature of the light collimator 116 can be described as parabolic, with its vertex located at the intersection of aperture plane 126 and its focus at the intersection of aperture plane 126 and the front reflector 102. Thus, the axis of the parabola is desirably parallel to aperture plane 126. In this embodiment, the light element is a cold cathode fluorescent lamp (CCFL) and the light element reflector can be described as a pair of involutes 118, 120.

In other embodiments, the light element reflector can be described by any general shape surrounding the light element. Such shapes include, but are not limited to, cross sections that are ovoid, rectangular, or trapezoidal.

In some applications it is desirable that the light elements have no direct line of sight to the front reflector, for example, when the tilt angle is 90°. In that case, the light element and the existing light element reflector may together further rotate about the point where the light element reflector intersects the front reflector. The light element reflector then may have a reflective extension between its distal end from the front reflector to the back reflector. That extension may be planar or curved. In one embodiment, the extension is a circular arc.

In other embodiments, the light element may be an LED or a row of LEDs with or without a light element reflector. In addition, the LEDs may have proximate to each and between each and the hollow cavity a refractive lens element that assists in light extraction and/or light collimation. There may additionally be light element reflectors either extending between the LED or, if present, the refractive lens element and the collimators. These light element reflectors may be planar or have a curved cross section. Desirably, heat sinks, for example, heat sinks that wrap around the light source and extend over a part of the collimator, can be used with LED light elements to draw heat away from the LED.

If desired, other visible light emitters such as hot cathode fluorescent lamps (HCFLs), external electrode fluorescent lamps (EEFLs), or light pipes, (for example, as described in U.S. Pat. No. 6,267,492), can be used in light sources for the disclosed backlights. In addition, hybrid systems such as, for example, (CCFL/LED), including cool white and warm white, CCFL/HCFL/EEFL, such as those that emit different spectra, may be used. The combinations of light emitters may vary widely, and include LEDs and CCFLs, and pluralities such as, for example, multiple CCFLs, multiple CCFLs of different colors, and LEDs and CCFLs.

The light element reflectors used with fluorescent lamps are desirably shaped in the form of a pair of involutes of the circular cross section of the fluorescent tube, as shown in FIG. 1.

Another embodiment of a backlight 200 of the invention is shown in FIG. 2. Backlight 200 comprises a front reflector 202 and a back reflector 204 which are disposed in a manner to form a hollow light cavity 206. Light source 208 is proximate the front reflector 202 and its position relative to the front reflector 202 is defined by a tilt angle 210, as defined above. Light source 208 comprises a light element 212, a light element reflector 214, and first and second asymmetric light collimators 216, 217 for directing light into the hollow light cavity 206. The boundary between the light collimator 216 and back reflector is where the tangent to the light collimator is horizontal 205. The light collimator 217 has length generally less than light collimator 216 and extends between the light source 208 and the front reflector 202.

Light collimator 217 may be planar or have curvature. It is desirable that light that strikes the front reflector 202 has a relatively large incidence angle. If tilt angle 210 is small so that there is some frontward propagating light that would strike front reflector 202 at a greater angle then is desired, light collimator 217 may be positioned so that it reflectively redirects the light downward and at an angle that upon reflection from back reflector 204, or light collimator 216, the light ray will strike front reflector 202 at the desired angle. Thus, the light collimation provided by light collimators 216 and 217 provide light rays from the light source at a desirably small angle to front reflector 202. In other embodiments, the curvature of the light collimator 217 can be described as a parabolic section. In this embodiment, the light element is a cold cathode fluorescent lamp (CCFL) and the light element reflector 214 can be described as a pair of involutes.

Another embodiment of a backlight 300 of the invention is shown in FIG. 3. Backlight 300 comprises a front reflector 302 and a back reflector 304 which are disposed in a manner to form a hollow light cavity 306. First and second light sources 208, 210 are each proximate the front reflector 302 and their position relative to the front reflector is defined by a tilt angle 312. Each light source comprises two light elements 314, a light element reflector 316, and a light collimator 318, 320 for each light source for directing light into the hollow light cavity 306. The boundary between the light collimator 318 and back reflector is where the tangent to the light collimator is horizontal 305.

Figure 7:
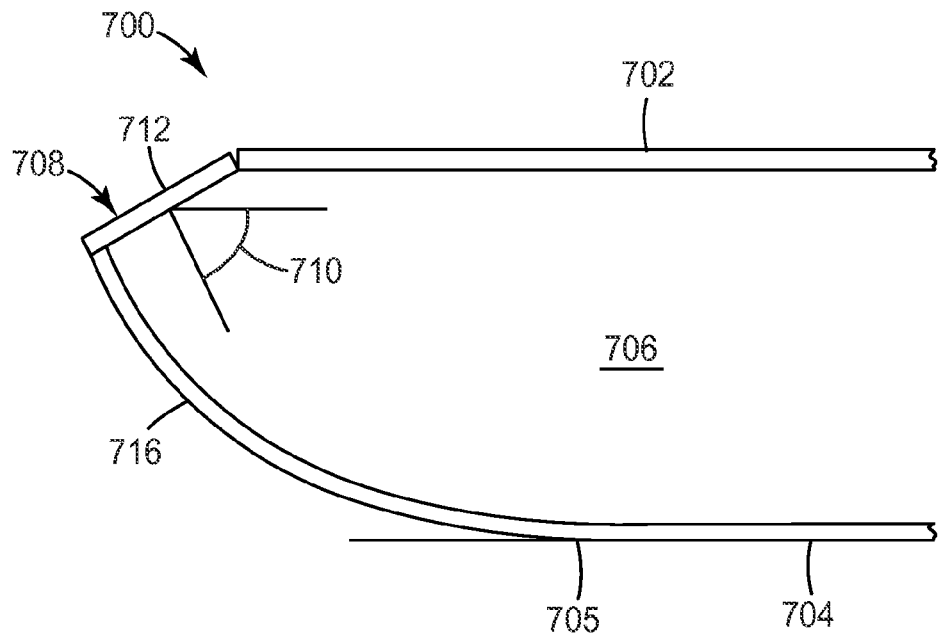
FIG. 7 is a schematic cross-sectional view of one embodiment of a backlight.
Figure 8:
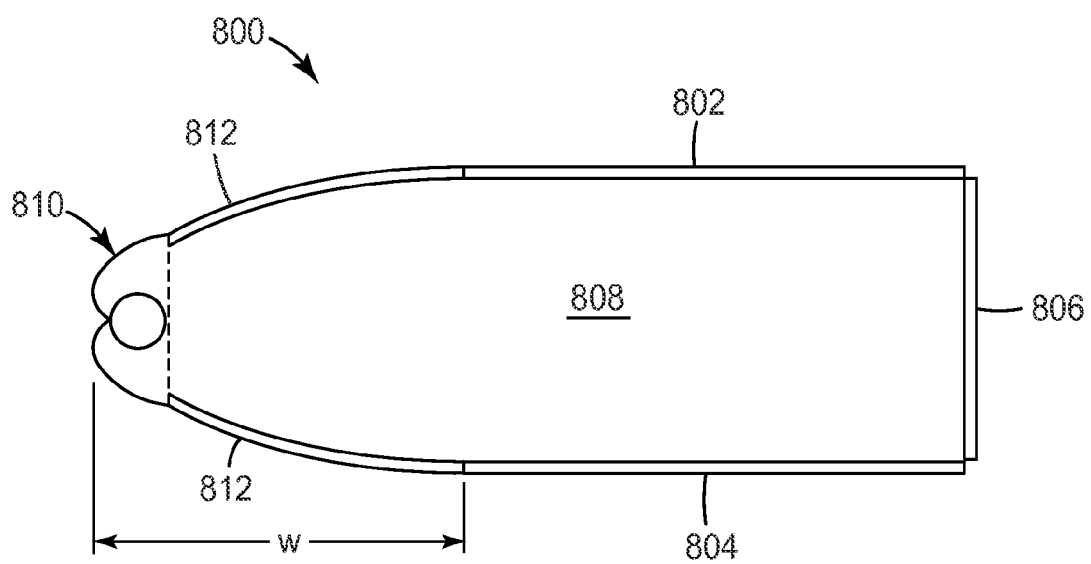
FIG. 8 is a schematic cross-sectional view of a prior art backlight.

Another embodiment of a backlight 700 of the invention is shown in FIG. 7. Backlight 700 comprises a front reflector 702 and a back reflector 704 which are disposed in a manner to form a hollow light cavity 706. Light source 708 is proximate the front reflector 702 and its position relative to the front reflector 702 is defined by a tilt angle 710, as defined above. Light source 208 comprises an LED die 712, and a first asymmetric light collimator 716 for directing light into the hollow light cavity 706. The boundary between the light collimator 716 and back reflector is where the tangent to the light collimator is horizontal 705.

Both the back reflector and the light collimator comprise a sheet material that provides a highly reflective surface facing into the hollow light cavity, the reflective surfaces 160, 162 being capable of causing limited controlled spreading of an incident light beam into a broadened reflected beam. Materials of this type are known under the general descriptions "scattering reflective materials" and can be further classified as either "wide" or "narrow" scattering reflective materials, depending on the angular spread of the reflected beam (see "Daylighting in Architecture—A European Reference Book", published by James and James, London, 1993. ISBN 1-873936-21-4, at pages 4.3 to 4.5). Generally, the reflective surfaces 160, 162 comprise a narrow scattering reflector (meaning that it has a dispersion angle of less than about 15° or, more typically for the present application, between about 5° and 15°) but should be such that its reflectivity is not reduced substantially for light that is incident in directions other than normal to the surface, and is at least 85% (preferably at least 90% and, most desirably, at least 98%).

The term "dispersion angle" means the angle between the direction of maximum intensity ($I_{max}$) of reflected light and the direction of intensity with a value $I_{max}/2$, assuming an intensity of reflected light distribution curve that is symmetrical about the direction of $I_{max}$. If the intensity distribution curve of the reflected light is not symmetrical about the direction of $I_{max}$, the term dispersion angle as used herein means the mean angle between the direction of $I_{max}$ and a direction of intensity $I_{max}/2$. The broadened reflected beam may, or may not, exhibit a pronounced peak in the direction of maximum intensity.

Examples of suitable high reflectivity materials include VIKUITI™ Enhanced Specular Reflector (ESR) multilayer polymeric film available from 3M Company; a film made by laminating a barium sulfate-loaded polyethylene terephthalate film (2 mils thick) to VIKUITI™ ESR film using a 0.4 mil thick isooctylacrylate acrylic acid pressure sensitive adhesive, the resulting laminate film referred to herein as "EDR II" film; E-60 series LUMIRROR™ polyester film available from Toray Industries, Inc.; MIRO™ anodized aluminum films (including MIRO™ 2 film) available from Alanod Aluminum-Veredlung GmbH & Co.; and SILVERLUX and/or ECP 305+ Solar Film, available from 3M Company.

The reflective surface of the back reflector facing the hollow light cavity can be substantially flat and smooth, or it may have a structured surface associated with it to enhance light scattering or mixing. Such a structured surface can be imparted (a) on the reflective surfaces 160 of the back reflector or the collimator, or both, or (b) on a transparent coating applied to the surface. In the former case, a highly reflecting film may be laminated to a substrate in which a structured surface was previously formed, or a highly reflecting film may be laminated to a flat substrate (such as a thin metal sheet, as with VIKUITI™ Durable Enhanced Specular Reflector-Metal (DESR-M) reflector available from 3M Company) followed by forming the structured surface, such as with a stamping operation. In the latter case, a transparent film having a structured surface can be laminated to a flat reflective surface, or a transparent film can be applied to the reflector and then afterwards a structured surface imparted to the top of the transparent film, or a reflective metal coating may be applied, by evaporative coating for example, to either the structured side or planar side of a transparent film having a structured surface.

In another embodiment, the back reflector can be a semi-specular reflector. A "semi-specular reflector" refers to a reflector that reflects substantially more forward scattering than reverse scattering. Any suitable semi-specular material or materials can be used for the back reflectors of the present disclosure. For example, the semi-specular back reflectors can include a partially transmitting specular reflector on a high reflectance diffuser reflector. Suitable semi-specular reflectors include ESR (available from 3M Company) proximate to a linear lens film having elongated lenticular features structure on a first side or major surface, described below. The linear lens film lies between the front and back reflectors and its lenticular features run parallel to the light elements.

The microreplicated lenticular features are elongated and in many embodiments, are disposed parallel to one another. In many embodiments, the lenticular features have optical power in a vertical direction and negligible optical power in an orthogonal horizontal direction.

In one embodiment, the lenticular features have a radius of curvature in a range from 1 to 250 micrometers or from 10 to 100 micrometers, or from 25 to 75 micrometers. These prism features have a height in a range from 1 to 250 micrometers or from 1 to 75 micrometers, or from 5 to 50 micrometers. In many embodiments, the parallel elongated lenticular features described above have a period or pitch in a range from 1 to 1000 micrometers, or from 1 to 500 micrometers, or from 1 to 250 micrometers, or from 1 to 100 micrometers, or from 10 to 75 micrometers.

In another embodiment, a semi-specular back reflector can include a partial Lambertian diffuser on a high reflectance specular reflector. Alternatively, a forward scattering diffuser on a high reflectance specular reflector can provide a semi-specular back reflector. Another suitable semi-specular reflector is a film material embossed with a sand-blast pattern that is available, under the trade designation "RADIANT LIGHT FILM EMBOSSED VM2000", from 3M Company of St. Paul, Minn.

Figure 4:
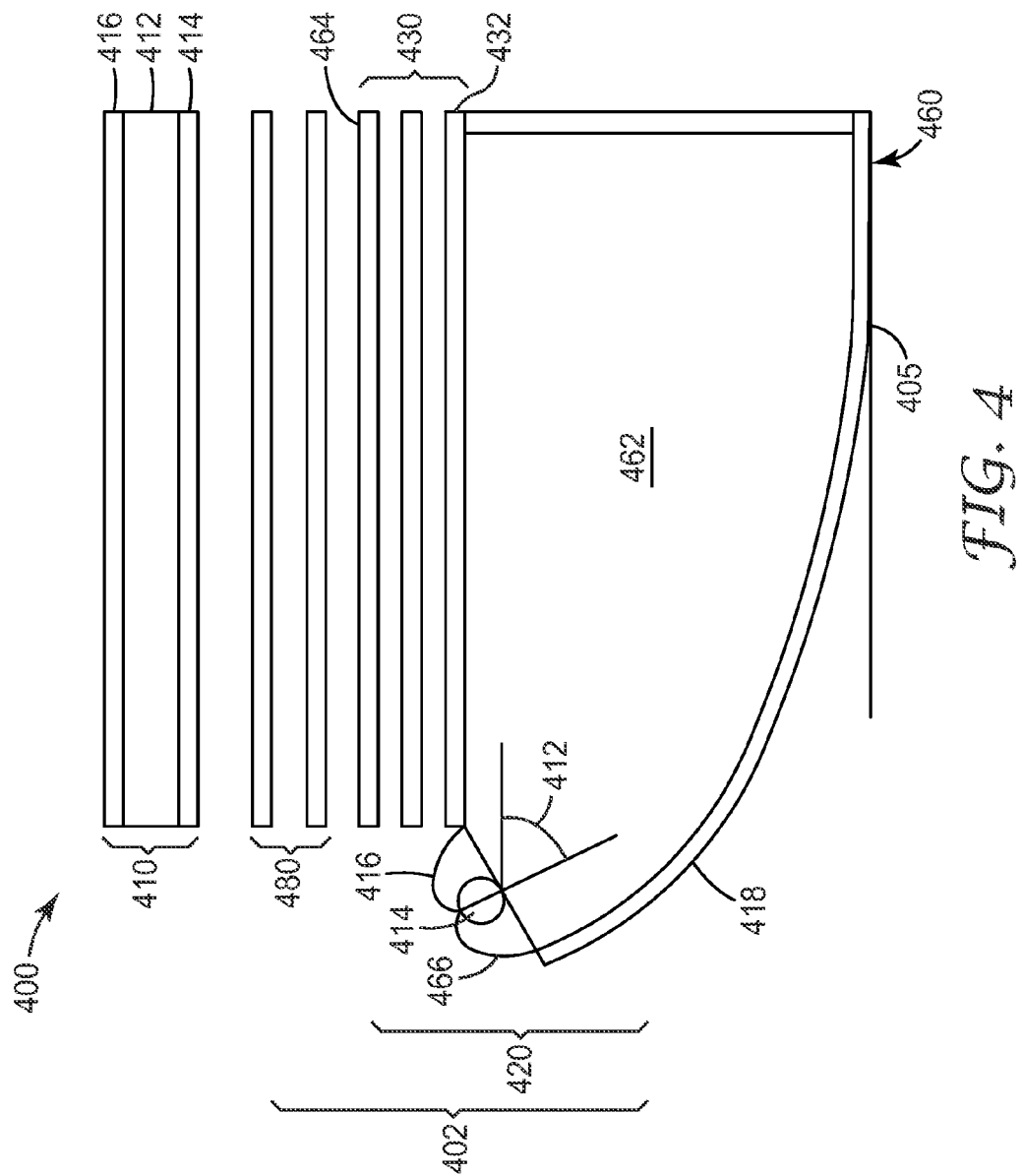
FIG. 4 is a schematic cross-sectional view of one embodiment of an optical display.

As mentioned herein, the backlights of the present disclosure can be used as backlights for display systems. FIG. 4 is a schematic cross-sectional view of one embodiment of an optical display 400. The display 400 includes a liquid crystal panel 410 and an illumination assembly 402 positioned to provide light to the LC panel 410. In this embodiment, the illumination assembly 402 includes a backlight 420 and may include additional light management components 480, such as optical films.

As illustrated in FIG. 4, the LC panel 410 includes a liquid crystal layer 412, an entry plate 414, and an exit plate 416. The entry and exit plates 414 and 416, which may each include a glass substrate, may each include an electrode matrix, alignment layers, polarizers, compensation films, protective layers, and other layers. A color filter array may also be included with either or both plates 414 and 416 for imposing color on the image displayed by the LC panel 410. In the LC panel 410, portions of the liquid crystal layer 412 have their optical state altered by an electric field applied via the electrode matrix. Depending on its state, a given portion (corresponding to a pixel or subpixel of the display 400) of the liquid crystal layer 412 will rotate the polarization of light transmitted through it by a greater or lesser magnitude. Light progressing through entry polarizer of entry plate 414, liquid crystal layer 412, and exit polarizer of exit plate 416 is attenuated to varying degrees depending on the orientation of the polarizers and the optical state of the portion of the liquid crystal layer that the light encounters. The display 400 exploits this behavior to provide an electronically-controllable display having different appearances in different areas.

An arrangement of light management components 480, which may also be referred to as a light management unit, may be positioned between the backlight 420 and the LC panel 410. The light management components 480 affect the illumination light propagating from the backlight 420. For example, the arrangement of light management components 480 may include a diffuser layer, or simply, diffuser. A diffuser is used to diffuse the light received from the backlight 420.

The diffuser may be any suitable diffuser film or plate. For example, the diffuser layer can include any suitable diffusing material or materials. In some embodiments, the diffuser layer may include a polymeric matrix of polymethyl methacrylate (PMMA) with a variety of dispersed phases that include glass, polystyrene beads, and $CaCO_3$ particles. Exemplary diffusers can include 3M™ SCOTCHCAL™ Diffuser Film, types 3635-30, 3635-70, and 3635-100, available from 3M Company, St. Paul, Minn.

The optional light management components 480 may also include a reflective polarizer. Any suitable type of reflective polarizer may be used, e.g., multilayer optical film (MOF) reflective polarizers; diffusely reflective polarizing film (DRPF), such as continuous/disperse phase polarizers; wire grid reflective polarizers; or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774 (Jonza et al.). Commercially available examples of MOF reflective polarizers include VIKUITI™ DBEF-D280 and DBEF-D400 multilayer reflective polarizers that include diffusive surfaces, available from 3M Company.

Examples of DRPF useful in connection with the present disclosure include continuous/disperse phase reflective polarizers as described, e.g., in co-owned U.S. Pat. No. 5,825,543 (Ouderkirk et al.), and diffusely reflecting multilayer polarizers as described, e.g., in co-owned U.S. Pat. No. 5,867, 316 (Carlson et al.). Other suitable types of DRPF are described in U.S. Pat. No. 5,751,388 (Larson).

Some examples of wire grid polarizers useful in connection with the present disclosure include those described, e.g., in U.S. Pat. No. 6,122,103 (Perkins et al.). Wire grid polarizers are available from, inter alia, Moxtek Inc., Orem, Utah.

Some examples of cholesteric polarizers useful in connection with the present disclosure include those described, e.g., in U.S. Pat. No. 5,793,456 (Broer et al.), and U.S. Pat. No. 6,917,399 (Pokorny et al.). Cholesteric polarizers are often provided along with a quarter wave retarding layer on the output side so that the light transmitted through the cholesteric polarizer is converted to linearly polarized light.

In some embodiments, a polarization control layer may be provided between the backlight 420 and a reflective polarizer. Examples of polarization control layers include a quarter wave retarding layer and a polarization rotating layer such as a liquid crystal polarization rotating layer. The polarization control layer may be used to change the polarization of light that is reflected from the reflective polarizer so that an increased fraction of the recycled light is transmitted through the reflective polarizer.

The optional arrangement of light management components 480 may also include one or more brightness enhancing layers or films, also referred to as directional recycling layers or films. A brightness enhancing layer is one that includes a surface structure that redirects off-axis light in a direction closer to the normal axis of the display. This increases the amount of light propagating on-axis through the LC panel 410, thus increasing the brightness and contrast of the image seen by the viewer. One example of a brightness enhancing layer is a prismatic brightness enhancing layer, which has a number of prismatic ridges that redirect the illumination light through refraction and reflection. Examples of prismatic brightness enhancing layers that may be used in the display system 100 include the VIKUITI™ BEF II and BEF III family of prismatic films available from 3M Company, including BEF II 90/24, BEF II 90/50, BEF IIIM 90/50, and BEF IIIT. Brightness enhancement may also be provided by some of the embodiments of front reflectors as is further described herein.

The optional arrangement of light management components 480 may also include other directional recycling films such as gain diffusers and include structures such as beads, rounded domes, pyramids or other protruding structures arranged in a regular or irregular matrix array on one or both major surfaces of a film or layer.

The display system 400 of the embodiment illustrated in FIG. 4 includes a backlight 420. The backlight 420 includes a front reflector 430 and a back reflector 460 that form a hollow light cavity 462. The cavity 462 includes an output surface 464. The output surface 464 may be any suitable shape, e.g., rectangular, and may be of a size usable for any desired display application, ranging, for example, from a sub-display for a mobile phone measuring approximately 30 mm diagonally to a laptop computer screen measuring approximately 30 cm diagonally to a monitor or television measuring approximately 50 cm, 80 cm, 100 cm, 150 cm, or larger diagonally. In this embodiment, the backlight 420 includes a single light source 466 disposed to emit light into the cavity 462. Light source 466 is proximate the front reflector 430 and its position relative to the front reflector 430 is defined by a tilt angle 412. Light source 466 comprises a light element 414, a light element reflector 416, and an asymmetric light collimator 418 for directing light into the hollow light cavity 462. In this embodiment, the backlight 420 can includes a side reflector or surface 468 surrounding the periphery of the hollow light cavity 462 on sides that do not include a light source. The same reflective material used for the back reflector 460 can be used to form these walls, or a different reflective material can be used.

The backlight 420 of display 400 of FIG. 4 includes a front reflector 430 that includes multiple directional recycling films or layers 432. In other embodiments, a single directional recycling film or layer is used. A directional recycling film is an optical film that generally includes a surface structure that redirects off-axis light in a direction closer to the axis of the display. This increases the amount of light propagating on-axis through the LC panel 410, thus increasing the brightness and contrast of the image seen by the viewer. A directional recycling film typically returns, or recycles, a significant fraction of the light incident upon it from the hollow light cavity 462 back into the hollow light cavity. Directional recycling films may also be referred to as brightness enhancing films or layers. Some directional recycling films may include an array of elongated prisms that redirect light. Other directional recycling films may be referred to as gain diffusers and include structures such as beads, rounded domes, pyramids or other protruding structures arranged in a regular or irregular matrix array on one or both major surfaces of a film or layer.

The front reflectors have a relatively high overall reflectivity to support relatively high recycling within the cavity. This can be characterized in terms of "hemispheric reflectivity," meaning the total reflectivity of a component or a stack of components (whether a surface, film, or collection of films) when light is incident on it from all possible directions. Thus, the component is illuminated with light (having a spectral distribution appropriate for an intended application) incident from all directions (and all polarization states, unless otherwise specified) within a hemisphere centered about a normal direction, and all light reflected into that same hemisphere is collected. The ratio of the total flux of the reflected light to the total flux of the incident light yields the hemispheric reflectivity, $R_{hemi}$. Characterizing a reflector in terms of its $R_{hemi}$ is especially convenient for recycling cavities because light is generally incident on the internal surfaces of the cavity—whether the front reflector, back reflector, or side reflectors—at all angles. Further, unlike the reflectivity for normal incidence, $R_{hemi}$ takes into account the variability of reflectivity with incidence angle, which may be very significant for some components (e.g., prismatic films).

Preferred back reflectors also have a high hemispherical reflectivity—typically much higher than the front reflector since the front reflector is deliberately designed to be partially transmissive in order to provide the required light output of the backlight. A recycling backlight configuration can be characterized in terms of the product of hemispheric reflectivities for both front and back reflectors, $R^f_{hemi}$ and $R^b_{hemi}$, respectively. Preferably, the product $R^f_{hemi}*R^b_{hemi}$ is at least 70% (0.70), or 75%, or 80%.

Front reflectors used in the backlights of the present disclosure may include two, three, four, five, six, or more directional recycling films in various combinations. In embodiments with prismatic films, such as BEF films, as well as other directional recycling films, the prismatic films may be disposed closest to the recycling cavity, with the other directional recycling films disposed further from the cavity than the prismatic films. Such direction films may be placed such that the prisms are aligned in parallel or perpendicular to an axis, for example, a light emission axis.

Prismatic optical films used as directional recycling films may include prisms of generally uniform shape, or they may include prisms whose shape, height, lateral position, and/or other dimensional characteristics may vary substantially from place to place on a film. Examples of prismatic optical films with varying geometry are described in U.S. Pat. No. 5,771,328 (Wortman, et al.) and U.S. Pat. No. 6,354,709 (Campbell, et al.), and U.S. Patent Publication No. 2007/0047, 254 A1 (Schardt, et al.)

In some embodiments, gain diffusers may be used as directional recycling films 432 in front reflector 430. One example of a gain diffuser is OPALUS BS-702, available from Keiwa Corp. Other gain diffusers are disclosed in U.S. Patent Publication Nos. 2006/0103777 A1 (Ko et al.), 2006/0146566 A1 (Ko et al.), 2006/0152943 A1 (Ko et al.), 2006/0146562 A1 (Ko et al.) 2006/0250707 A1 (Whitney et al.), and 2007/0024994 A1 (Whitney et al.). It will be appreciated by those of skill in the art that some gain diffusers described in the aforementioned U.S. Patent Applications include optical elements that are prismatic in nature, and may be described as including an array of prisms elongated upon an axis. Such optical films may be described as prismatic directional recycling films as well as being described as gain diffuser films. In some embodiments, front reflectors include gain diffusers without necessarily including prismatic directional recycling films. In other embodiments, one, two, three, or more gain diffusers of the same or differing construction are combined with two, three, or more prismatic films.

A front reflector 430 of a backlight 420 of the present disclosure may include optical films other than those characterized as directional recycling films. For example, front reflector 430 may include a reflective polarizer such as DBEF, DRPF, or APF, as described herein. Inclusion of such a reflective polarizer may improve performance of a backlight in a variety of ways, including making the backlight more efficient, or able to produce more usable light for a given energy input to the light source or sources.

In other embodiments, a front reflector can comprise (from closest to hollow light cavity) a diffuser plate, a BEF film (prisms perpendicular to light source), a gain diffuser, and a BEF film (prisms parallel to light source); a diffuser plate, a BEF film having a diffuser coating or a unitary diffuser integral with the prisms (prisms perpendicular to light source) as described in U.S. Application No. 61/013,782, filed on Dec. 14, 2007, incorporated by reference for its description of optical articles, and a BEF film (prisms parallel to light source). In other embodiments, the diffuser plate can be a clear plate.

Directional recycling films and other optical films of a front reflector of a backlight may be free standing, or some or all may be physically attached to each other by any suitable technique, including such techniques as disclosed herein in conjunction with the description of other films in a light management unit of a display. Further, the description of films as included in either a "front reflector" or a "light management unit" may be considered arbitrary and non-exclusive.

Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

EXAMPLE

Figure 5:
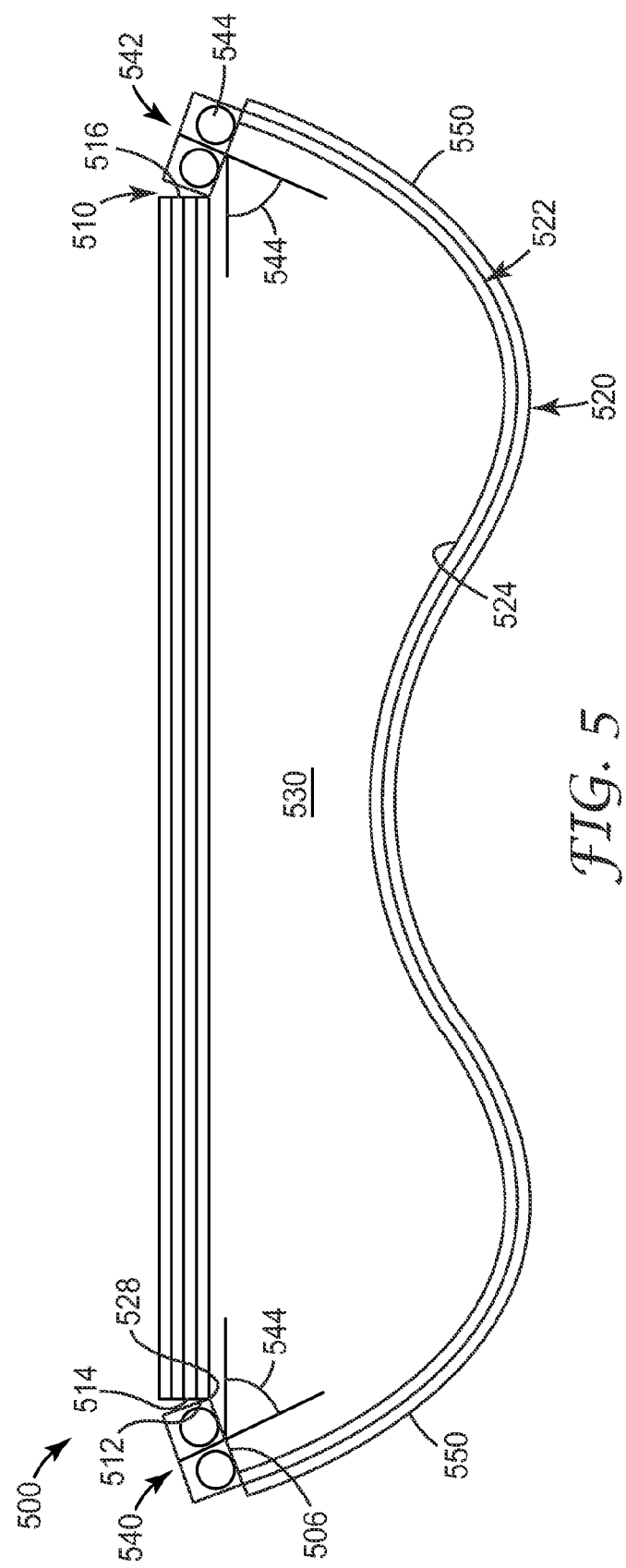
FIG. 5 is a schematic cross-sectional view of one embodiment of an optical display.

A backlight testing prototype was constructed similar to the backlight depicted in FIG. 5. Backlight 500 comprised a multilayer front reflector 510 and a back reflector 520 which were disposed in a manner to form a hollow light cavity 530. First and second light sources 540, 542 were each proximate the front reflector 510 and their position relative to the front reflector was defined by a tilt angle 544 of 60°. The light elements 544 were CCFLs. Front reflector contained a clear plate 512 (ACRYLITE FF acrylic sheet, from Cyro Industries, Parsippany, N.J.), a brightness enhancement film having an elongated prism structure 514 (BEFII-5T, from 3M Company, St. Paul, Minn.) with the prisms running perpendicular to the light sources. Over film 514, was a gain diffuser film 516 (from an ACER 19 inch monitor, model No. AL1916W, 16:10 aspect ratio) and above film 516 was a prism film 518 having rounded tips (RBEF-8M, from 3M Company) having elongated prisms running parallel to the light elements.

Light collimators 550 were formed from SOMOS photopolymer 11120 (DSM Desotech, Inc., Elgin, Ill.) and then laminated with DESR-M reflector. The curve of the light collimators can be described as a parabolic, with its vertex at the intersection of aperture plane 526 with collimator 550 and its focus at the intersection 528 of aperture plane 526 and front reflector 510. Thus, the axis of the parabola is parallel to aperture plane 526.

The back reflector 520 was formed from DESR-M, then pulled taut over a central post, and held in place with double-sided tape to form a reflective surface 522. Disposed on the reflective surface of the collimators and back reflector was a linear lens film 524 having a pitch of about 45 micrometers and a lens height of 4 micrometers.

The viewing angles were measured using an AUTRONIC-MELCHERS CONOSCOPE (Karlsruhe, Germany). Defining the view angle to be the angle at which the luminance falls to 50% of the axial luminance, the horizontal view angle was ±46° and the vertical view angle was ±36.5°. These viewing angles are quite appropriate for TV and monitor applications.

Figure 6:
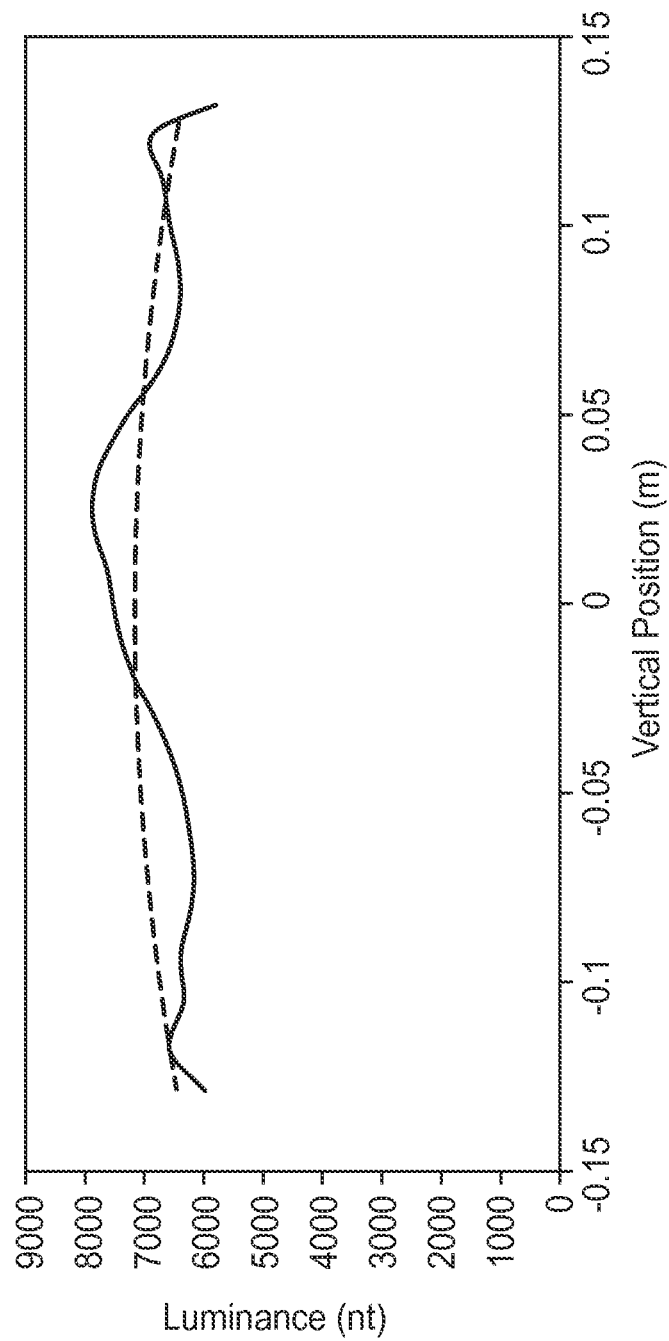
FIG. 6 is a plot of luminance versus vertical position.

The spatial uniformity was measured using a PROMETRIC imaging photometer, Model number PM-1613F-1 from Radiant Imaging (Duvall, Wash.). A vertical profile through the center of the display is shown in FIG. 6. The measured profile is shown by the solid line and a desired profile is shown by the dashed line. The narrowing of the cavity was effective in increasing the light extraction in the center. The measured data has a maximum of 7880 cd/m$^2$ and the minimum divided by the maximum is 80%. A preferred profile is shown by the dashed line in FIG. 6. The preferred profile has the same integrated area under the curve as does the measured profile. The center luminance of this preferred profile is 7170 cd/m$^2$.

What is claimed is:

1. A backlight, comprising:
   a front reflector and a back reflector disposed to form a hollow light cavity;
   a first light source proximate one end of the front reflector and having a tilt angle of from 45° to 90°, wherein the tilt angle is defined by an intersection of a line parallel with a tangent to a plane of the front reflector and a line normal to and bisecting an aperture plane of the first light source; and
   a first asymmetric light collimator for directing light from the first light source into the hollow light cavity, wherein the first light collimator has a curvature that extends from the aperture plane of the first light source to a point on the back reflector where a line tangent to the first light collimator is horizontal.

2. The backlight of claim 1, wherein the asymmetric light collimator is parabolic.

3. The backlight of claim 1, wherein the first light source comprises a light element and a light element reflector in the shape of a pair of involutes.

4. The backlight of claim 1, further comprising a side reflector surrounding a periphery opposite the light source.

5. The backlight of claim 1, wherein the light source comprises a light element comprising a CCFL.

6. The backlight of claim 1, wherein the light source comprises a light element comprising an LED.

7. The backlight of claim 1, further comprising a second asymmetric light collimator extending between the first light source and the front reflector.

8. The backlight of claim 1, wherein the first asymmetric light collimator and the back reflector are unitary.

9. The backlight of claim 1, wherein the back reflector comprises a scattering reflective material.

10. The backlight of claim 1, wherein the back reflector further comprises a linear lens film.

11. The backlight of claim 1, wherein the front reflector comprises multiple layers.

12. The backlight of claim 1, further comprising a second light source proximate another end of the front reflector and having a tilt angle of from 5° to 90°; and
   a second asymmetric light collimator extending between the second light source and the back reflector for directing light from the second light source into the hollow light cavity.

13. The backlight of claim 1, wherein the front reflector comprises at least one of a diffuser plate, a gain diffuser, a brightness enhancement film, a reflective polarizer, or any combination of any of them.

14. The backlight of claim 1, wherein the light source comprises a light element reflector and the light element reflector has a cross-sectional shape that is ovoid, rectangular, or trapezoidal.

15. The backlight of claim 1, wherein the light source comprises an LED and a heat sink.

16. The backlight of claim 2, wherein a vertex of a parabola formed by the first light collimator is at an intersection of the aperture plane of the first light source.

17. The backlight of claim 2, wherein a focus of a parabola formed by the first light collimator is at an intersection of the aperture plane of the first light source and the plane of the front reflector.

18. The backlight of claim 2, wherein an axis of a parabola formed by the first light collimator is parallel to the aperture plane of the first light source.

19. The backlight of claim 1, wherein the back reflector comprises a semi-specular material.

20. A backlight comprising:
   a front reflector and a back reflector disposed to form a hollow light cavity;
   a light source proximate one end of the front reflector, wherein the light source has a tilt angle of from 5° to 90°, wherein the tilt angle is defined by an intersection of a line parallel with a tangent to a plane of the front reflector and a line normal to and bisecting an aperture plane of the light source; and
   an asymmetric, parabolic light collimator extending between at least the light source and the back reflector for directing light from the light source into the hollow light cavity, wherein a vertex of a parabola formed by the light collimator is at an intersection of the aperture plane of the light source.

21. The backlight of claim 20, wherein an axis of the parabola formed by the light collimator is parallel to the aperture plane of the light source.

22. The backlight of claim 20, wherein a focus of the parabola formed by the light collimator is at an intersection of the aperture plane of the light source and a plane of the front reflector.

23. The backlight of claim 20, wherein a focus of the parabola formed by the light collimator is at an intersection of the aperture plane of the light source and a plane of the front reflector.

24. The backlight of claim 20, further comprising a second asymmetric light collimator extending between the light source and the front reflector.

* * * * *